US009096782B2

(12) United States Patent
Takahira et al.

(10) Patent No.: US 9,096,782 B2
(45) Date of Patent: Aug. 4, 2015

(54) POLYESTERS, POLYESTER COMPOSITIONS, PRESSURE-SENSITIVE ADHESIVE COMPOSITIONS, PRESSURE-SENSITIVE ADHESIVE LAYERS AND PRESSURE-SENSITIVE ADHESIVE SHEETS

(75) Inventors: Hitoshi Takahira, Ibaraki (JP); Satomi Yoshie, Ibaraki (JP); Tadashi Nakajima, Ohtsu (JP); Daiki Funaoka, Ohtsu (JP); Katsuya Shimeno, Ohtsu (JP)

(73) Assignees: NITTO DENKO CORPORATION, Osaka (JP); Toyo Boseki Kabushiki Kaisha, Osaka (JP)

( * ) Notice: Subject to any disclaimer, the term of this patent is extended or adjusted under 35 U.S.C. 154(b) by 402 days.

(21) Appl. No.: 13/057,689

(22) PCT Filed: Aug. 5, 2009

(86) PCT No.: PCT/JP2009/063856
§ 371 (c)(1),
(2), (4) Date: Feb. 4, 2011

(87) PCT Pub. No.: WO2010/016514
PCT Pub. Date: Feb. 11, 2010

(65) Prior Publication Data
US 2011/0135924 A1 Jun. 9, 2011

(30) Foreign Application Priority Data

Aug. 6, 2008 (JP) .................................. 2008-203352

(51) Int. Cl.
| C08G 63/08 | (2006.01) |
| C08G 63/16 | (2006.01) |
| C09J 167/04 | (2006.01) |
| C09J 175/06 | (2006.01) |
| C08G 18/42 | (2006.01) |
| C08G 18/79 | (2006.01) |
| C08G 63/60 | (2006.01) |
| C09J 167/00 | (2006.01) |
| C09J 175/04 | (2006.01) |
| C09J 7/02 | (2006.01) |

(52) U.S. Cl.
CPC ........... *C09J 175/06* (2013.01); *C08G 18/4202* (2013.01); *C08G 18/428* (2013.01); *C08G 18/4233* (2013.01); *C08G 18/792* (2013.01); *C08G 63/60* (2013.01); *C09J 7/0207* (2013.01); *C09J 167/00* (2013.01); *C09J 175/04* (2013.01); *C08G 2170/40* (2013.01); *C09J 2467/00* (2013.01); *Y10T 428/2852* (2015.01)

(58) Field of Classification Search
None
See application file for complete search history.

(56) References Cited

U.S. PATENT DOCUMENTS

| 5,133,408 | A | * | 7/1992 | Tackett | 166/270 |
| 5,804,347 | A | * | 9/1998 | Inoue et al. | 430/108.1 |
| 5,869,567 | A | * | 2/1999 | Fujita et al. | 524/608 |
| 6,353,066 | B1 | * | 3/2002 | Sosa | 526/224 |
| 6,479,001 | B1 | * | 11/2002 | Tsai et al. | 264/143 |
| 6,552,118 | B2 | * | 4/2003 | Fujita et al. | 524/588 |
| 6,803,443 | B1 |  | 10/2004 | Ariga et al. |  |
| 7,070,051 | B2 | * | 7/2006 | Kanner et al. | 206/382 |
| 2001/0019766 | A1 | * | 9/2001 | Masuda et al. | 428/345 |
| 2006/0189759 | A1 | * | 8/2006 | Walther et al. | 525/192 |

FOREIGN PATENT DOCUMENTS

| EP | 1 219 695 A2 | 7/2002 |
| JP | 08003297 A * | 1/1996 |
| JP | 08-157798 | 6/1996 |
| JP | 8-157798 A | 6/1996 |
| JP | 11-241056 | 9/1999 |
| JP | 11-241056 A | 9/1999 |
| JP | 2001-072749 | 3/2001 |
| JP | 2001-072749 A | 3/2001 |
| JP | 2001-335623 A | 12/2001 |
| JP | 2002-088145 | 3/2002 |
| JP | 2002-088145 A | 3/2002 |
| JP | 2002-103550 | 4/2002 |
| JP | 2002-103550 A | 4/2002 |
| JP | 2003-128898 | 5/2003 |
| JP | 2003-128898 A | 5/2003 |
| JP | 2004-231797 | 8/2004 |
| JP | 2004-231797 A | 8/2004 |
| JP | 2006-070091 | 3/2006 |

(Continued)

OTHER PUBLICATIONS

Human translation of JP 2004231797 A (2004).*

(Continued)

*Primary Examiner* — Frank D Ducheneaux

(74) *Attorney, Agent, or Firm* — Sughrue Mion, PLLC

(57) ABSTRACT

The present invention provides a polyester, a polyester composition and a pressure-sensitive adhesive composition capable of obtaining a pressure-sensitive adhesive which is global-environmentally friendly and is excellent in pressure-sensitive adhesion properties, using a plant-derived raw material; and a pressure-sensitive adhesive layer and a pressure-sensitive adhesive sheet which can be obtained by using the same. A polyester of the present invention is a polyester comprising at least a lactic acid unit, a dibasic acid unit and a glycol unit, wherein the dibasic acid unit contains dimer acid, and the polyester has a glass transition temperature as measured at a temperature rising rate of 20° C./minute using a differential scanning calorimeter, of −70 to −20° C., a weight average molecular weight of 20,000 to 300,000 and a hydroxyl value of 1 to 100 mgKOH/g.

9 Claims, No Drawings

(56) References Cited

FOREIGN PATENT DOCUMENTS

| JP | 2006-070091 A | 3/2006 |
|----|---------------|--------|
| JP | 2006-131705   | 5/2006 |
| JP | 2006-131705 A | 5/2006 |
| JP | 2008-031456   | 2/2008 |
| JP | 2008-031456 A | 2/2008 |

OTHER PUBLICATIONS

Human translation of JP 08003297 A (1996).*

Chinese Office Action dated Aug. 3, 2012, issued in Chinese Application No. 200980131029.0.

International Search Report of PCT/JP2009/063856 dated Nov. 10, 2009.

International Preliminary Reporting on Patentability and Translation of the Written Opinion of the International Searching Authority, issued Mar. 17, 2011 in International Patent Application No. PCT/JP2009/063856.

Office Action issued Jul. 25, 2013 by the Japanese Patent Office in counterpart patent application No. 2008-203352.

Communication dated Dec. 19, 2014, enclosing an Extended European Search Report, issued by the European Patent Office in corresponding application No. 09804997.

* cited by examiner

POLYESTERS, POLYESTER COMPOSITIONS, PRESSURE-SENSITIVE ADHESIVE COMPOSITIONS, PRESSURE-SENSITIVE ADHESIVE LAYERS AND PRESSURE-SENSITIVE ADHESIVE SHEETS

TECHNICAL FIELD

The present invention relates to Polyesters, Polyester compositions, pressure-sensitive adhesive compositions, pressure-sensitive adhesive layers and pressure-sensitive adhesive sheets.

BACKGROUND ART

As a preventive measure against depletion of a fossil resource and global warming, use of a plant-derived raw material which is a regeneratable material is recently recommended.

Under these circumstances, a synthetic rubber and an acrylic raw material have mainly used as a material of a pressure-sensitive adhesive heretofore, and a plant-derived acrylic pressure-sensitive adhesive which can be used in the pressure-sensitive adhesive is not found at present.

On the other hand, in a polyester-based pressure-sensitive adhesive, a plant-derived component exists as a raw material component thereof such as dicarboxylic acid and a diol component, and a burden on global environment can be reduced by using these regeneratable circulation type raw materials.

As the polyester-based pressure-sensitive adhesive, a polyester using polycaprolactone diol, which is liquid at room temperature, as the diol component is disclosed (Patent Document 1).

Also, Patent Document 2 proposes a polyester which uses, as a main raw material, an aliphatic diol or dicarboxylic acid having a polycarbonate structure, a hydrogenated dimer acid prepared by hydrogenation of a dimer acid which is obtained by dimerization of an unsaturated fatty acid having 18 carbon atoms such as linoleic acid, or a hydrogenated dimer diol prepared by reduction of the hydrogenated dimer acid.

However, the polyesters described in aforementioned Patent Documents 1 and 2 are not plant-derived polyesters.

On the other hand, polylactic acid is known as a plant-derived raw material, and a trial of using a polyester, which uses the polylactic acid, in a pressure-sensitive adhesive is made. For example, Patent Document 3 discloses a biodegradable pressure-sensitive adhesive containing, as essential components, an aliphatic polyester (A) which contains 55% by weight or more of a lactic acid residue, and has a molar ratio (L/D) of L-lactic acid to D-lactic acid of 0.11 to 9 and a reduced viscosity within a range from 0.2 to 1.0 dl/g; and a natural product-based tackifying resin (B).

Also, Patent Document 4 discloses a pressure-sensitive adhesive containing polylactic acid, a glass transition temperature reducing agent composed of a raw material having biodegradability and/or a plant-derived raw material, and a tackifier.

Furthermore, Patent Document 5 discloses a biodegradable pressure-sensitive adhesive containing a aliphatic polyester-based resin (A) prepared by reacting lactic acid as a main raw material, and rosin or a rosin derivative (B), wherein the lactic acid is composed of L-lactic acid and D-lactic acid in a molar ratio (L/D) of 1 to 9 and a glass transition temperature (Tg) is from −5 to −60° C.

However, it was difficult for the pressure-sensitive adhesives which use a polylactic acid-based polyester disclosed in Patent Documents 3 to 5 to obtain sufficient pressure-sensitive adhesion properties.

Patent Document 1: JP-A 08-157798
Patent Document 2: JP-A 11-241056
Patent Document 3: JP-A 2004-231797
Patent Document 4: JP-A 2006-070091
Patent Document 5: JP-A 2006-131705

Thus, an object of the present invention is to provide a polyester, a polyester composition and a pressure-sensitive adhesive composition capable of obtaining a pressure-sensitive adhesive which is global-environmentally friendly and is excellent in pressure-sensitive adhesion properties, using a plant-derived raw material; and a pressure-sensitive adhesive layer and a pressure-sensitive adhesive sheet which can be obtained by using the same.

MEANS FOR SOLVING THE PROBLEMS

The present inventors have intensively studied so as to solve the above problem, and thus have found the following polyester and have completed the present invention.

That is, a polyester of the present invention is a polyester comprising at least a lactic acid unit, a dibasic acid unit and a glycol unit, wherein the dibasic acid unit contains dimer acid, and the polyester has a glass transition temperature as measured at a temperature rising rate of 20° C./minute using a differential scanning calorimeter, of −70 to −20° C., a weight average molecular weight of 20,000 to 300,000 and a hydroxyl value of 1 to 100 mgKOH/g.

Preferably, in the polyester of the present invention, the polyester contains 10 to 50 mol % of the lactic acid unit, and contains 50 to 90 mol % of a component other than the lactic acid unit, wherein a molar ratio of the dibasic acid unit to the glycol unit is from 1:0.8 to 1:1.2.

Preferably, in the polyester of the present invention, the dibasic acid unit further contains an aliphatic dibasic acid other than dimer acid.

Preferably, in the polyester of the present invention, the polyester contains, as a component other than the lactic acid unit, the dibasic acid unit and the glycol unit, a tri- or higher functional carboxylic acid and/or polyol, wherein a dispersion degree (Mw/Mn) is from 2.5 to 10.0.

Preferably, in the polyester of the present invention, an acid value is 5 mgKOH/g or less.

Preferably, a polyester composition of the present invention is a polyester composition comprising: 50 to 99 parts by weight of the polyester, and 1 to 50 parts by weight of a branched polyester oligomer having a hydroxyl value of 100 to 1,000 mgKOH/g.

Preferably, a pressure-sensitive adhesive composition of the present invention is a pressure-sensitive adhesive composition comprising the polyester or the polyester composition containing a crosslinking agent.

Preferably, in the pressure-sensitive adhesive composition, the crosslinking agent is a polyvalent isocyanurate.

Preferably, a pressure-sensitive adhesive layer is formed from the pressure-sensitive adhesive composition.

Preferably, in the pressure-sensitive adhesive layer, a storage elastic modulus as measured under the conditions of 23° C. and a frequency of 1 Hz using a dynamic viscoelasticity measuring apparatus is from $1 \times 10^4$ to $1 \times 10^7$ Pa.

In addition, a pressure-sensitive adhesive sheet of the invention is preferable that the pressure-sensitive adhesive layer is formed on at least one surface of a support.

EFFECT OF THE INVENTION

In the present invention, a lactic acid unit and dimer acid being a plant-derived raw material is used. Therefore, it is possible to obtain a polyester, a polyester composition and a pressure-sensitive adhesive composition which are global-environmentally friendly and are also capable of obtaining a pressure-sensitive adhesive having excellent pressure-sensitive adhesion properties by adjusting a specific glass transition temperature (Tg), a weight average molecular weight and a hydroxyl value; and an pressure-sensitive adhesive layer and a pressure-sensitive adhesive sheet which can be obtained by using the same. Accordingly, the present invention is effective.

BEST MODE FOR CARRYING OUT THE INVENTION

The polyester of the present invention contains at least a lactic acid unit, a dibasic acid unit and a glycol unit.

The lactic acid unit is not particularly limited and examples thereof include L-lactide, D-lactide, DL-lactide, mesolactide, L-lactic acid, D-lactic acid and DL-lactic acid. Among them, DL-lactide is preferred from the viewpoint of efficiency of the polymerization reaction and the solubility in a solvent. A polyester having desired properties can be obtained by copolymerizing these lactic acid units. These lactic acid units can be used alone, or in combination of two or more kinds thereof.

The content of the lactic acid unit in the polyester component is preferably from 10 to 50 mol %, and more preferably from 15 to 45 mol %. When the content is less than 10 mol %, an elastic modulus of a pressure-sensitive adhesive layer which uses the polyester decreases, and thus pressure-sensitive adhesion properties of the pressure-sensitive adhesive may vary with the lapse of time. In contrast, when the content is more than 50 mol %, a glass transition temperature (Tg) of the polyester increases, and thus pressure-sensitive adhesion properties may deteriorate, unfavorably.

On the other hand, the content of the component other than the lactic acid unit in the polyester component is preferably from 50 to 90 mol %, and more preferably from 55 to 85 mol %. When the content is less than 50 mol %, pressure-sensitive adhesion properties of the pressure-sensitive adhesive which uses the polyester may deteriorate. In contrast, when the content is more than 90 mol %, a cohesive strength of the pressure-sensitive adhesive which uses the polyester decreases, and thus an adhering (pressure-sensitive adhering) strength with a sticking material (base material, support, etc.) may decrease, unfavorably.

The dibasic acid unit in the present invention contains dimer acid. As the dimer acid unit, a hydrogenated dimer acid may be used. A polyester having excellent pressure-sensitive adhesion properties can be obtained by copolymerizing these dibasic acid units. These dibasic acid units can be used alone, or in combination of two or more kinds thereof.

In the polyester of the present invention, the dibasic acid unit preferably contains an aliphatic dibasic acid other than the dimer acid. By copolymerizing the aliphatic dibasic acid other than the dimer acid, compatibility between the dimer acid and the lactic acid can be improved and an improvement in solvent solubility can be expected.

The aliphatic dibasic acid is not particularly limited and examples thereof include polyvalent carboxylic acid, and an alkyl ester thereof and an acid anhydride.

Examples of the polyvalent carboxylic acid include aliphatic and alicyclic dicarboxylic acids, such as adipic acid, azelaic acid, sebacic acid, 1,4-cyclohexanedicarboxylic acid, 4-methyl-1,2-cyclohexanedicarboxylic acid, dodecenylsuccinic anhydride, fumaric acid, succinic acid, dodecane diacid, hexahydrophthalic anhydride, tetrahydrophthalic anhydride, maleic acid, maleic anhydride, itaconic acid and citraconic acid, and sebacic acid is particularly preferred since it is obtained from plants. These can be used alone, or in combination of two or more kinds thereof.

Furthermore, aromatic dibasic acid can be used as long as properties of the polyester of the present invention do not deteriorate. The aromatic dibasic acid is not particularly limited and examples thereof include terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid and 4,4'-diphenyletherdicarboxylic acid. These can be used alone, or in combination of two or more kinds thereof.

The glycol unit is not particularly limited and, for example, an aliphatic glycol can be used. It becomes possible to increase the molecular weight of the polyester of the present invention by using the aliphatic glycol, thus making it possible to improve pressure-sensitive adhesion properties and durability of the pressure-sensitive adhesive which uses the polyester.

Examples of the aliphatic glycol include ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol and 1,2-cyclohexanedimethanol, and 1,3-propanediol is particularly preferred since it is obtained from plants. These can be used alone, or in combination of two or more kinds thereof.

A glycol unit other than the aliphatic glycol maybe used in combination as long as properties of the polyester of the present invention do not deteriorate, and examples thereof include an ethylene oxide adduct and a propylene oxide adduct of bisphenol A, an ethylene oxide adduct and a propylene oxide adduct of hydrogenated bisphenol A, polytetramethylene glycol, polypropylene glycol, polyethylene glycol and polycarbonate glycol. These can be used alone, or in combination of two or more kinds thereof.

A molar ratio of the dibasic acid unit to the glycol unit is preferably from 1:0.8 to 1:1.2, and more preferably from 1:0.9 to 1:1.1. When the molar ratio is less than 1:0.8 (the content of the glycol unit is low), an acid value may increase or a molecular weight may decrease. When the molar ratio is more than 1:1.2 (the content of the glycol unit is high), a molecular weight may decrease and pressure-sensitive adhesion properties tend to deteriorate, unfavorably.

Furthermore, the polyester of the present invention preferably further contain, as a component other than the lactic acid unit, dibasic acid unit and glycol unit, a tri- or higher functional carboxylic acid and/or a polyol. A dispersion degree (Mw/Mn) is preferably from 2.5 to 10.0, and more preferably from 2.5 to 9.5. When the dispersion degree is within the above range, it is effective since a pressure-sensitive adhering strength can be improved and transfer of the pressure-sensitive adhesive to the adherend can be prevented. It is possible to further increase the molecular weight of the polyester of the present invention by containing a tri- or higher functional carboxylic acid and/or a polyol, and the pressure-sensitive adhesive which uses this polyester is excellent in pressure-sensitive adhesion properties. Mw represents a weight average molecular weight, while Mn represents a number average molecular weight.

The tri- or higher functional carboxylic acid is not particularly limited and examples thereof include trimellitic acid, pyromellitic acid, benzophenonetetracarboxylic acid, biphenyltetracarboxylic acid, ethylene glycol bis(anhydrotrimellitate) and glycerol tris(anhydrotrimellitate).

Examples of the tri- or higher functional polyol include glycerin, trimethylolpropane, pentaerythritol and polyglycerin.

The content of the tri- or higher functional carboxylic acid and/or the polyol in the polyester component is preferably from 0.01 to 10 mol %, and more preferably from 0.1 to 5 mol %, from the viewpoint of reactivity.

Glycolic acid or lactones can be copolymerized (used) as long as properties of the polyester of the present invention do not deteriorate, and it is also possible to modify molecular ends by adding and polymerizing the glycolic acid or lactones after polymerizing other components. It is also possible to modify molecular ends into carboxyl groups by adding and polymerizing acid anhydride after polymerizing other components. These can be used alone, or in combination of two or more kinds thereof.

In the polyester of the present invention, a glass transition temperature (Tg) as measured at a temperature rising rate of 20° C./minute using a differential scanning calorimeter is from −70 to −20° C., and preferably from −60 to −40° C. When Tg is lower than −70° C., the retention force may decrease. In contrast, when Tg is higher than −20° C., pressure-sensitive adhesion properties of the pressure-sensitive adhesive which uses the polyester at normal temperature may deteriorate, unfavorably.

The polyester of the present invention has a weight average molecular weight of 20,000 to 300,000, and preferably from 50,000 to 300,000. When the weight average molecular weight is less than 20,000, a pressure-sensitive adhering strength of the pressure-sensitive adhesive which uses the polyester may decrease. In contrast, when the weight average molecular weight is more than 300,000, a decrease in cohesive strength and a decrease in retention force may arise, unfavorably.

The polyester of the present invention has a hydroxyl value of 1 to 100 mgKOH/g, and preferably 3 to 100 mgKOH/g. When the hydroxyl value is less than 1 mgKOH/g, reactivity with a crosslinking agent may become worse and a cohesive strength of the pressure-sensitive adhesive which uses the polyester may decrease. In contrast, when the hydroxyl value is more than 100 mgKOH/g, water resistance may deteriorate, unfavorably.

The polyester of the present invention preferably has an acid value of 5 mgKOH/g or less, and more preferably 0.1 to 3 mgKOH/g. When the acid value is more than 5 mgKOH/g, hydrolysis may be accelerated and durability may deteriorate, unfavorably.

The polyester composition of the present invention preferably contains 50 to 99 parts by weight of the polyester (polyester (i)) and also contains 1 to 50 parts by weight of a branched polyester oligomer (ii) having a hydroxyl value of 100 to 1,000 mgKOH/g. The polyester composition of the present invention more preferably contains 65 to 99 parts by weight of the polyester (i) and also contains 1 to 35 parts by weight of a branched polyester oligomer (ii) having a hydroxyl value of 100 to 800 mgKOH/g. By mixing the branched polyester oligomer (ii), curing (crosslinking) is accelerated and, when used as the pressure-sensitive adhesive, contamination to the adherend after re-peeling can be reduced, and thus it is effective. When the hydroxyl value is less than 100 mgKOH/g, the curing acceleration effect may become insufficient. In contrast, when the hydroxyl value is more than 1,000 mgKOH/g, solubility in a general-purpose organic solvent may deteriorate, unfavorably. When the amount of the branched polyester oligomer (ii) is less than 1 part by weight, the curing acceleration effect may become insufficient. In contrast, when the amount is more than 50 parts by weight, pressure-sensitive adhesion properties may deteriorate, unfavorably.

Furthermore, the total hydroxyl value of the polyester composition is preferably from 10 to 200 mgKOH/g. When the total hydroxyl value is less than 10 mgKOH/g, the curing acceleration effect may become insufficient. In contrast, when the total hydroxyl value is more than 200 mgKOH/g, pressure-sensitive adhesion properties may deteriorate, unfavorably.

The branched polyester oligomer (ii) has a branch in the structure and has satisfactory solubility in an organic solvent, and is also comparatively inexpensive from an economical point of view.

The branched polyester oligomer (ii) preferably has a number average molecular weight of 1,000 to 8,000, and more preferably 1,000 to 6,000. When the number average molecular weight is less than 1,000, contamination to the adherend may arise. In contrast, when the number average molecular weight is more than 8,000, reactivity with the crosslinking agent may deteriorate, unfavorably.

There is no particular limitation on the structure of branched polyester oligomer (ii). For example, it is preferred to have a structure containing those obtained by a polycondensation reaction or a polyaddition reaction of an ABx type compound as a main skeleton. Herein, the ABx type compound means a compound having both different functional groups A and B (organic groups). The ABx type compound is a compound having a functional group which does not cause an intramolecular condensation or an intramolecular addition reaction, but can cause an intermolecular condensation or an intermolecular addition reaction. Particularly preferred is a compound which has an ester bond in the main skeleton, and also has different functional groups, for example, a carboxyl group or a derivative group thereof as a functional group A, and a hydroxyl group or a derivative group thereof as a functional group B, and has both functional groups.

Specific examples of the ABx type compound include 2,2-dimethylolpropionic acid, 2,2-dimethylolbutanoic acid, 5-(2-hydroxyethoxy)isophthalic acid, 5-acetoxyisophthalic acid, 3,5-bis(2-hydroxyethoxy)benzoic acid, 3,5-bis(2-hydroxyethoxy)benzoic acid methyl ester, 4,4-(4'-hydroxyphenyl) pentanoic acid, 5-hydroxycyclohexane-1,3-dicarboxylic acid, 1,3-dihydroxy-5-carboxycyclohexane, 5-(2-hydroxyethoxy)cyclohexane-1,3-dicarboxylic acid and 1,3-(2-hydroxyethoxy)-5-carboxycyclohexane. It is particularly preferred to use 2,2-dimethylolpropionic acid or 2,2-dimethylolbutanoic acid from the viewpoints of general-purpose properties of a compound as a raw material, and convenience of the polymerization reaction process.

The branched polyester oligomer (ii) is effective since it has an ester bond and is therefore excellent in compatibility with the polyester (i), resulting in more enhanced transparency of these reactants (crosslinked materials). A branched polyester oligomer (ii) composed of an aliphatic monomer is particularly preferred since it tends to be more excellent in compatibility.

According to the method of producing the branched polyester oligomer (ii), the branched polyester oligomer can be synthesized by reacting the ABx type compound alone in the presence of a condensation reaction catalyst. It is also possible to use as a branch point of the branched polyester oligomer (ii) a polyhydric hydroxyl group-containing compound, a polyvalent carboxylic acid, or a compound having both a hydroxyl group and a carboxyl group.

Examples of the polyhydric hydroxyl group-containing compound include various general-purpose glycol compounds, and tri- or higher functional hydroxyl group-containing compounds such as trimethylolpropane, pentaerythritol and dipentaerythritol.

Examples of the polyvalent carboxylic acid include various general-purpose dibasic acids, and tri- or higher functional carboxylic acid compounds such as trimellitic acid, pyromellitic acid and benzophenonetetracarboxylic acid.

Furthermore, examples of the compound having both a hydroxyl group and a carboxyl group include glycolic acid, hydroxypivalic acid, 3-hydroxy-2-methylpropionic acid, lactic acid, glyceric acid, malic acid and citric acid.

It is also possible to use, as the branch point of the branched polyester oligomer (ii), a straight-chain (linear) polyester oligomer obtained by a condensation reaction of dibasic acid and a glycol compound, and a specific functional group-containing branched polyester oligomer (iii) obtained by copolymerizing the oligomer with a tri- or higher functional polyhydric hydroxyl group-containing compound or a polyvalent carboxylic acid, in addition to the polyhydric hydroxyl group-containing compound, the polyvalent carboxylic acid, or the compound having both a hydroxyl group and a carboxyl group.

It is possible to use, as a raw material of the straight-chain (linear) polyester oligomer and the specific functional group-containing branched polyester oligomer (iii) which can serves as the branch point, various general-purpose dibasic acids, a glycol compound, a tri- or higher functional polyvalent carboxylic acid and a polyhydric alcohol compound.

Examples of the dibasic acid include aliphatic dibasic acids such as succinic acid, adipic acid, azelaic acid, sebacic acid and dodecanoic acid; aromatic dibasic acids such as terephthalic acid, isophthalic acid, orthophthalic acid, 1,2-naphthalenedicarboxylic acid and 1,6-naphthalenedicarboxylic acid; and alicyclic dibasic acids such as 1,2-cyclohexanedicarboxylic acid, 1,4-cyclohexanedicarboxylic acid and 4-methyl-1,2-cyclohexanedicarboxylic acid. Among them, from the viewpoint of heat resistance, terephthalic acid, isophthalic acid, orthophthalic acid, 1,2-naphthalenedicarboxylic acid and 1,6-naphthalenedicarboxylic acid are preferred, and terephthalic acid, 1,2-naphthalenedicarboxylic acid and 1,6-naphthalenedicarboxylic acid are particularly preferred.

Examples of the glycol compound include aliphatic diols such as ethylene glycol, 1,2-propylene glycol, 1,3-propylene glycol, 1,2-butylene glycol, 1,3-butylene glycol, 2,3-butylene glycol, 1,4-butylene glycol, 2-methyl-1,3-propylene glycol, neopentyl glycol, 3-methyl-1,5-pentadiol, 2,2,4-trimethyl-1,3-pentanediol, 2,4-diethyl-1,5-pentanediol, 2-ethyl-1,3-hexanediol, 2,2-dimethyl-3-hydroxypropyl-2',2'-dimethyl-3'-hydroxypropanate, 2-n-butyl-2-ethyl-1,3-propanediol, 3-ethyl-1,5-pentanediol, 3-propyl-1,5-pentanediol, 2,2-diethyl-1,3-propanediol and 3-octyl-1,5-pentanediol; alicyclic glycols such as 1,3-bis(hydroxymethyl)cyclohexane, 1,4-bis(hydroxymethyl)cyclohexane, 1,4-bis(hydroxyethyl)cyclohexane, 1,4-bis(hydroxypropyl)cyclohexane, 1,4-bis(hydroxymethoxy)cyclohexane, 1,4-bis(hydroxyethoxy)cyclohexane, 2,2-bis(4-hydroxymethoxycyclohexyl)propane, 2,2-bis(4-hydroxyethoxycyclohexyl)propane, bis(4-hydroxycyclohexyl)methane, 2,2-bis(4-hydroxycyclohexyl)propane and 3(4),8(9)-tricyclo[5.2.1.0$^{2,6}$]decanedimethanol; and aromatic glycols such as an ethylene oxide adduct and a propylene oxide adduct of bisphenol A or the like.

Furthermore, examples of the tri- or higher functional polyvalent carboxylic acid and the polyhydric hydroxyl group-containing compound include trimellitic acid, pyromellitic acid, benzophenonetetracarboxylic acid, glycerin, trimethylolpropane and pentaerythritol.

Examples of a method of removing water produced by the polymerization (condensation) reaction include a method in which azeotropic dehydration is conducted using toluene or xylene, a method in which an inert gas is bubbled into a reaction system thereby ejecting produced water and monoalcohol out of the reaction system, together with the inert gas, and a method of distilling under reduced pressure.

It is possible to use, as a polymerization catalyst used in the polymerization (condensation) reaction, those used as a polymerization catalyst used in a conventional polyester, and examples of usable polymerization catalyst include, but are not limited to, various metal compounds such as titanium-based, tin-based, antimony-based, zinc-based and germanium-based compounds; and strong acid compounds such as p-toluenesulfonic acid and sulfuric acid.

In order to improve compatibility with the polyester, it is more preferred to introduce a long-chain hydrocarbon group having 6 or more carbon atoms into the end group of a branched polyester oligomer. Examples of the method of introducing a hydrocarbon group having 6 or more carbon atoms include a method in which a compound having a hydrocarbon group of 6 or more carbon atoms is subjected to the addition or condensation reaction with a carboxyl group or a hydroxyl group at the end of a branched polyester oligomer synthesized in advance. Examples of the compound include monoalcohols having a long-chain alkyl group, such as hexanol, octanol, decyl alcohol, undecyl alcohol and dodecyl alcohol; and monocarboxylic acids having a long-chain alkyl or an alkenyl group, such as octanoic acid, decanoic acid, dodecanoic acid, myristic acid, palmitic acid, stearic acid, and oleic acid having an unsaturated group, or methyl ester derivatives.

The method further includes a method in which a carboxylic anhydride compound having a hydrocarbon group of 6 or more carbon atoms is ring-opening added to a terminal hydroxyl group in the presence of a basic catalyst, and a method in which a compound having a hydrocarbon group of 6 or more carbon atoms and a glycidyl group is added to a terminal carboxyl group through the reaction in the presence of a proper catalyst such as triphenylphosphine. Examples of the compound having a hydrocarbon group include an acid anhydride compound and specific examples thereof include dodecenylsuccinic anhydride and octadecylsuccinic anhydride. Examples of the compound having a glycidyl group include various aryl glycidyl ethers such as phenyl glycidyl ether; polyethylene glycol mono glycidyl ether, polypropylene glycol monoglycidyl ether, and polytetramethylene glycol monoglycidyl ether; and monoglycidyl ethers such as alkyl, alkenyl and alkynyl glycidyl ethers.

In a preferred aspect, the polyester or polyester composition is produced from a plant-derived raw material. The reason is that the plant-derived raw material is biodegradable and is said to be a carbon neutral, thus making it possible to obtain an environmentally friendly type pressure-sensitive adhesive which is global-environmentally friendly. As a standard of the content of the plant-derived raw material, biomass degree is preferably 70% or more, and more preferably 80% or more. Herein, biomass degree (%) is calculated by the proportion of the plant-derived monomer component from the weight of the plant-derived monomer component to the weight of all monomer components constituting the polyester or polyester composition. Examples of the plant-derived raw material include, for example, acid components such as lactic acid, dimer acid and sebacic acid; and glycol (diol) components such as 1,3-propylene glycol.

In the pressure-sensitive adhesive composition of the present invention, the polyester or the polyester composition preferably contains a crosslinking agent. A pressure-sensitive adhesive layer can be obtained by appropriately performing the crosslinking reaction of a pressure-sensitive adhesive composition containing a crosslinking agent. The crosslinking agent is not particularly limited and conventionally known crosslinking agents can be used. For example, a polyvalent isocyanurate, a polyfunctional isocyanate, a polyfunctional melamine compound, a polyfunctional epoxy compound, a polyfunctional oxazoline compound, a polyfunctional aziridine compound and a metal chelate compound can be used. From the viewpoints of obtaining transparency and high gel fraction of the obtained pressure-sensitive adhesive layer, in a preferred aspect, a polyvalent isocyanurate or a polyfunctional isocyanate compound is used.

Examples of the polyvalent isocyanurate include a polyisocyanurate compound of hexamethylene diisocyanate. Use of the polyvalent isocyanurate is effective since it is possible to achieve an object of obtaining transparency and high gel fraction of the obtained pressure-sensitive adhesive layer. It is also possible to use commercially available products of the polyvalent isocyanurate and specific examples thereof include DURANATE TPA-100® (trade name, manufactured by Asahi Kasei Chemicals Corporation), and CORONATE HK®, CORONATE HX® and "CORONATE 2096" (trade names, manufactured by Nippon Polyurethane Industry Co., Ltd.). These can be used alone, or in combination of two or more kinds thereof.

The polyfunctional isocyanate compound is not particularly limited and is preferably a compound having at least two or more isocyanate groups, and more preferably three or more isocyanate groups in the molecule (may be two or more isocyanate groups when the branched polyester oligomer (ii) is mixed), and specific examples thereof include aliphatic polyisocyanates, alicyclic polyisocyanates and aromatic polyisocyanates. These can be used alone, or in combination of two or more kinds thereof.

Examples of the aliphatic polyisocyanates include tetramethylene diisocyanates such as 1,2-ethylene diisocyanate, 1,2-tetramethylene diisocyanate, 1,3-tetramethylene diisocyanate and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; and 2-methyl-1,5-pentane diisocyanate, 3-methyl-1,5-pentane diisocyanate and lysin diisocyanate.

Examples of the alicyclic polyisocyanates include isophorone diisocyanate; cyclohexyl diisocyanates such as 1,2-cyclohexyl diisocyanate, 1,3-cyclohexyl diisocyanate and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyletherdiisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate and xylylene-1,3-diisocyanate.

It is possible to use, as the polyfunctional isocyanate compound, for example, dimers and trimers of the aliphatic polyisocyanates, alicyclic polyisocyanates, aromatic polyisocyanates and araliphatic polyisocyanates. Specific examples thereof include a dimmer and a trimer of diphenylmethane diisocyanate; a reaction product of trimethylolpropane and tolylene diisocyanate; a reaction product of trimethylolpropane and hexamethylene diisocyanate; and polymers such as polymethylene polyphenylisocyanate, polyether polyisocyanate and polyester polyisocyanate.

It is also possible to use commercially available products as the polyfunctional isocyanate compound, and specific examples thereof include CORONATE L® (trade name, manufactured by Nippon Polyurethane Industry Co., Ltd.) as a trimer adduct of trimethylolpropane and tolylene diisocyanate, and CORONATE HL® (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidylaniline and glycerin diglycidyl ether. These can be used alone, or in combination of two or more kinds thereof.

The use amount of the crosslinking agent is preferably from 0.001 to 20 parts by weight, and more preferably from 0.001 to 10 parts by weight, based on 100 parts by weight of the polyester or polyester composition. When the use amount is less than 0.001 parts by weight, the cohesive strength cannot be improved when a pressure-sensitive adhesive layer is formed. In contrast, when the use amount is more than 20 parts by weight, the obtained pressure-sensitive adhesive layer cannot attain sufficient pressure-sensitive adhering strength and the pressure-sensitive adhering strength decreases, unfavorably.

It is possible to obtain a pressure-sensitive adhesive composition (and a pressure-sensitive adhesive, a pressure-sensitive adhesive layer) having desired properties by using the polyester or polyester composition in combination with a tackifying resin, together with the crosslinking agent.

The tackifying resin is not particularly limited and conventionally known tackifying resins can be used. Examples thereof include a terpene-based tackifying resin, a phenol-based tackifying resin, a rosin-based tackifying resin, an aliphatic petroleum resin, an aromatic petroleum resin, a copolymer-based petroleum resin, an alicyclic petroleum resin, a xylene resin, an epoxy-based tackifying resin, a polyamide-based tackifying resin, a ketone-based tackifying resin and an elastomer-based tackifying resin. It is particularly preferred to use a plant-derived rosin-based resin and a terpene-based tackifying resin. These can be used alone, or in combination of two or more kinds thereof.

Specifically, it is possible to use, as the terpene-based resin, an α-pinene polymer, a β-pinene polymer, a dipentene polymer, and terpene-based resins obtained by phenol modification, aromatic modification, hydrogenation modification and hydrocarbon modification of them.

Specifically, it is possible to use, as the phenol-based tackifying resin, condensates of various phenols such as phenol, m-cresol, 3,5-xylenol, p-alkylphenol and resorcin, and formaldehyde can be used. It is also possible to use resol obtained by an addition reaction of the phenols and formaldehyde in the presence of an alkali catalyst, novolak obtained by a condensation reaction of the phenols and formaldehyde in the presence of an acid catalyst, and a rosin-modified phenol resin obtained by adding phenol to rosins such as an unmodified or modified rosin, or a derivatives thereof in the presence of an acid catalyst, followed by thermopolymerization.

Specifically, it is possible to use, as the rosin-based tackifying resin, unmodified rosins (raw rosins) such as gum rosin, wood rosin and tall oil rosin; modified rosins obtained by hydrogenation, dismutation, polymerization and other chemical modification of these unmodified rosins; and derivatives thereof.

The additive amount of the tackifying resin is preferably from 10 to 100 parts by weight, more preferably from 15 to 80 parts by weight, and particularly preferably from 20 to 60 parts by weight, based on 100 parts by weight of the polyester or polyester composition. When the additive amount is less than 10 parts by weight, the effect due to the addition cannot be obtained and the desired pressure-sensitive adhering strength cannot be obtained, and also the pot life prolonging effect cannot obtained. In contrast, when the additive amount is more than 100 parts by weight, the crosslinking effect due to the crosslinking agent becomes insufficient and compatibility with the polymer component (polyester or polyester composition) is poor, and also a problem such as a decrease in pressure-sensitive adhering strength arises, unfavorably.

As long as properties of the pressure-sensitive adhesive composition of the present invention (and pressure-sensitive adhesive, pressure-sensitive adhesive layer) are not impaired, it is possible to use common additives such as ultraviolet absorbers, photostabilizers, peeling regulators, plasticizers, softening agents, fillers, colorants such as pigments and dyes, antioxindants and surfactants.

The pressure-sensitive adhesive layer of the present invention is preferably formed by the pressure-sensitive adhesive composition. It is possible to obtain a pressure-sensitive adhesive layer which is global-environmentally friendly and is excellent in pressure-sensitive adhesion properties, by using the pressure-sensitive adhesive composition.

In the pressure-sensitive adhesive layer of the present invention, a storage elastic modulus as measured under the conditions of 23° C. and a frequency of 1 Hz using a dynamic viscoelasticity measuring apparatus is preferably from $1\times10^4$ to $1\times10^7$ Pa, and more preferably from $1\times10^5$ to $1\times10^6$ Pa. When the storage elastic modulus is less than $1\times10^4$ Pa, there arises a problem that the cohesive strength and the retention force of the pressure-sensitive adhesive layer decreases. In contrast, when the storage elastic modulus is more than $1\times10^7$ Pa, there arises a problem that the pressure-sensitive adhesive layer becomes hard and the pressure-sensitive adhering strength decreases.

The thickness of the pressure-sensitive adhesive layer of the present invention can be appropriately selected. For example, the thickness is preferably from about 5 to 1,000 µm, more preferably from 20 to 500 µm, and still more preferably from about 50 to 200 µm. The pressure-sensitive adhesive layer may be in any form of a single layer and a laminate.

In the pressure-sensitive adhesive sheet of the present invention, the pressure-sensitive adhesive layer is preferably formed on at least one surface of a support. As long as properties of the pressure-sensitive adhesive sheet of the present invention are impaired, the pressure-sensitive adhesive sheet of the present invention may have an intermediate layer or an undercoating layer.

The support is not particularly limited and conventionally known supports can be used. For example, it is possible to use papers such as a glassine paper, a kraft paper, a Japanese paper, a high quality paper and a synthetic paper; fabrics (woven fabrics) made from fibrous substances, for example, natural fibers, semisynthetic fibers or synthetic fibers, such as a cotton cloth and a staple cloth; nonwoven fabrics made from fibrous substances, for example, natural fibers, semisynthetic fibers or synthetic fibers, such as rayon, polyvinyl alcohol fibers (vinylon), polyester fibers, polyamide fibers (nylon fibers), polyolefin fibers (polypropylene fiber, polyethylene fiber, etc.), acrylic fibers, acetate fibers, Manila hemp and cotton; porous plastic base materials such as polyolefin-based, polyester-based and polyurethane-based films and sheets; polyolefin resins, for example, homopolymers, random copolymers and block copolymers, such as low density polyethylene, middle density polyethylene, high density polyethylene, linear low density polyethylene, ethylene/α-olefin copolymer, ethylene/vinyl acetate copolymer, ethylene/ethyl acrylate copolymer, ethylene/methyl methacrylate copolymer, ethylene/n-butylacrylate copolymer and polypropylene. When the porous plastic base material and nonwoven fabric are used, a non-porous base material such as a plastic film or sheet can be laminated on one surface thereof.

In the support, if necessary, various additives used in a conventional base material for a pressure-sensitive adhesive tape (support), such as ultraviolet absorbers, photostabilizers, antioxidants, fillers, pigments and dyes can be used.

The support can be appropriately subjected to physical treatments such as a corona discharge treatment and a plasma treatment; and chemical treatments such as an undercoating treatment and a back treatment.

The thickness of the support (base material) can be appropriately selected according to the material and form. For example, the thickness is preferably from about 1 to 1,000 µm, and more preferably from about 20 to 500 µm.

The pressure-sensitive adhesive layer can be formed in accordance with known methods for producing a pressure-sensitive adhesive sheet, for example, a method in which a solution of a pressure-sensitive adhesive in a solvent, or a hot melt is applied on a support (base material); a method in which a pressure-sensitive adhesive layer formed by applying on a release liner is transferred; a method in which a pressure-sensitive adhesive layer-forming material is applied while extruding on a support (base material) to form a pressure-sensitive adhesive layer; a method in which a support (base material) and a pressure-sensitive adhesive layer are extruded in the form of two layers or multi-layers; a method in which a pressure-sensitive adhesive layer is single-layer laminated on a support (base material); a method in which a pressure-sensitive adhesive layer is two-layer laminated, together with a laminate layer; and a method in which a pressure-sensitive adhesive layer and a support (base material) -forming material such as a film or a laminate layer are two-layer or multi-layer laminated. It is also possible to use a method in which a pressure-sensitive adhesive layer is subjected to co-extrusion molding of two layers or multi-layers, together with a support (base material) layer made of a thermoplastic resin, using an inflation method or a T-die method. The pressure-sensitive adhesive sheet of the present invention includes a pressure-sensitive adhesive film and a pressure-adhesive tape.

A conventionally known coater can be used in the method of applying the pressure-sensitive adhesive composition. Specific examples thereof include a gravure roll coater, a reverse roll coater, a kiss roll coater, a dip roll coater, a bar coater, a knife coater and a spray coater.

The release liner is not particularly limited and conventionally known release liners can be appropriately used. For example, it is possible to use a release liner in which a release coat layer is formed on at least one surface of a base material (base material for a release liner). The base material for a release liner can use any form of a single layer and plural layers.

It is possible to use, as the base material for a release liner, various thin leaf-shaped materials such as a plastic film, a paper, a foam and a metal foil, and a plastic film is particularly preferred. Examples of the raw material of the plastic film include polyesters such as polyethylene terephthalate; polyolefins such as polypropylene and an ethylene-propylene copolymer; and thermoplastic resins such as polyvinyl chloride.

The thickness of the base material for a release liner can be appropriately selected according to the purposes.

The release coat layer is not particularly limited and a conventionally known one can be used. For example, it is also possible to provide a coat layer formed from an appropriate release agent such as silicone-based, long-chain alkyl-based and fluorine-based.

The pressure-sensitive adhesive sheet of the present invention can be widely used as a substitute of a conventionally well-known pressure-sensitive adhesive sheet. However, because of a small burden on the global environment upon disposal after use, the pressure-sensitive adhesive sheet is re-peeled after use and can be preferably used in applications where wastes are generated. For example, the pressure-sensitive adhesive sheet can be preferably used as a pressure-sensitive adhesive sheet having applications such as surface protection and process materials.

EXAMPLES

The present invention will be described in more detail by way of Examples of the present invention, but the present invention is not limited to these Examples. Parts in Examples are by weight. The contents of formulations and evaluation results are shown in Table 1 and Table 2.
(Preparation of Polyester)

Example 1-1

In a reaction can equipped with a stirrer, a thermometer, and a condenser for outflow, 86 parts of dimer acid, 10 parts of sebacic acid, 30 parts of 1,3-propylene glycol, 0.4 parts of trimethylolpropane, 50 parts of DL-lactide, and 0.014 parts of tetrabutyl titanate and 0.014 parts of tin octylate as polymerization catalysts were charged. After raising a temperature to 250° C. over 5 hours under a normal pressure in a nitrogen atmosphere, the mixture was reacted for 1 hour and distilled water was removed out of the system and the esterification reaction was conducted. Furthermore, the pressure was reduced to 10 mmHg over 30 minutes and initial polymerization was conducted at 250° C. for 30 minutes. Furthermore, the pressure was reduced to 1 mmHg and latter polymerization was conducted at 250° C. for 30 minutes to obtain a polyester A. The evaluation results of the obtained polyester A are shown in Table 1.

Example 1-2

In the same manner as in Example 1-1, a polyester B was obtained using 74 parts of dimer acid, 4 parts of sebacic acid, 30 parts of neopentyl glycol, 1.2 parts by weight of trimethylolpropane, 65 parts of DL-lactide, and 0.009 parts of tetrabutyl titanate and 0.018 parts of tin octylate. The evaluation results of the obtained polyester B are shown in Table 1.

In the same manner as in Example 1-1, a polyester C was obtained using 96 parts of dimer acid, 25 parts of 1,3-propylene glycol, 0.3 parts by weight of trimethylolpropane, 49 parts of DL-lactide, and 0.011 parts of tetrabutyl titanate and 0.013 parts of tin octylate. The evaluation results of the obtained polyester C are shown in Table 1.

In the same manner as in Example 1-1, a polyester D was obtained using 79 parts of dimer acid, 9 parts of sebacic acid, 28 parts of 1,3-propylene glycol, 49 parts of DL-lactide, and 0.011 parts of tetrabutyl titanate and 0.013 parts of tin octylate. The evaluation results of the obtained polyester D are shown in Table 1.

Comparative Example 1-1

In a reaction can equipped with a stirrer, a thermometer and a condenser for outflow, 30 parts of L-lactide, 20 parts of DL-lactide, 33 parts of ε-caprolactone, 0.2 parts of neopentyl glycol, and 0.026 parts of tin octylate as a polymerization catalyst were charged. After raising a temperature to 180° C. over 1 hour under a normal pressure in a nitrogen atmosphere, the mixture was further reacted for 3 hours. Next, the pressure was reduced to 1 mmHg over 10 minutes and the residual lactide was removed by reducing the pressure at 180° C. for 30 minutes to obtain a polyester E. The evaluation results of the obtained polyester E are shown in Table 1.

In the same manner as in Comparative Example 1-2, a polyester F was obtained using 21 parts of L-lactide, 14 parts of DL-lactide, 53 parts of ε-caprolactone, 0.2 parts of ethylene glycol, and 0.029 parts of tin octylate as a polymerization catalyst. The evaluation results of the obtained polyester F are shown in Table 1.

Comparative Example 1-3

In a reaction can equipped with a stirrer, a thermometer and a condenser for outflow, 86 parts of dimer acid, 10 parts of sebacic acid, 30 parts of 1,3-propylene glycol, 0.4 parts of trimethylolpropane, 50 parts of DL-lactide, and 0.014 parts of tetrabutyl titanate and 0.014 parts of tin octylate as polymerization catalysts were charged. After raising a temperature to 250° C. over 5 hours under a normal pressure, the mixture was further reacted for 1 hour, distilled water was removed out of the system, and the esterification reaction was conducted. Furthermore, the pressure was reduced to 10 mmHg over 30 minutes to obtain a polyester G. The evaluation results of the obtained polyester G are shown in Table 1.
(Preparation of Pressure-sensitive Adhesive Composition)

Example 2-1

After dissolving 100 parts of a polyester A in a mixed solvent of 75 parts of methyl ethyl ketone (MEK) and 75 parts of ethyl acetate, 8 parts of polyisocyanurate (trade name DURANATE TPA100®, manufactured by Asahi Kasei Chemicals Corporation) as a crosslinking agent was mixed. The mixture was applied on a polyethylene terephthalate film subjected to a release treatment so as to be a thickness after drying of 50 μm, dried at 80° C. for 3 minutes and then allowed to stand at 50° C. for 5 days to obtain a pressure-sensitive adhesive sheet.

Example 2-3

After dissolving 100 parts of a polyester A and 8 parts of a branched polyester oligomer (trade name hyperbranched polymer BOLTORN H20®, hydroxyl value: 500 mgKOH/g, weight average molecular weight: 2,100) in a mixed solvent of 100 parts of methyl ethyl ketone (MEK) and 100 parts of ethyl acetate, 10 parts of polyisocyanate (trade name CORONATE HK®, manufactured by Nippon Polyurethane Industry Co., Ltd.) as a crosslinking agent was mixed. The mixture was applied on a polyethylene terephthalate film subjected to a release treatment so as to be a thickness after drying of 50 μm, dried at 80° C. for 3 minutes and then allowed to stand at 50° C. for 5 days to obtain a pressure-sensitive adhesive sheet.

Example 2-4

A pressure-sensitive adhesive sheet was obtained in the same manner as in Example 2-3, except that 8 parts of a branched polyester oligomer (trade name hyperbranched polymer BOLTORN H20®, hydroxyl value: 490 mgKOH/g, weight average molecular weight: 5,100) and 6 parts of polyisocyanate (trade name CORONATE HK®, manufactured by Nippon Polyurethane Industry Co., Ltd.) as a crosslinking agent were mixed.

Example 2-5

A pressure-sensitive adhesive sheet was obtained in the same manner as in Example 2-3except that 30 parts of a branched polyester oligomer having a long-chain hydrocarbon group introduced therein (trade name hyperbranched polymer BOLTORN H2004®, hydroxyl value: 120 mgKOH/g, weight average molecular weight: 3,200) and 6 parts of polyisocyanate (trade name CORONATE HK®, manufactured by Nippon Polyurethane Industry Co., Ltd.) as a crosslinking agent were mixed.

Example 2-2, Comparative Examples 2-1 to 2-3

Pressure-sensitive adhesive sheets were obtained in the same manner as in Example 2-1, except for the contents of the formulations.

With respect to the obtained polyesters, pressure-sensitive adhesive layers and pressure-sensitive adhesive sheets using the same, the following evaluations were conducted. The evaluation results are shown in Table 1 and Table 2.
(Composition of Polyester)
A polyester was dissolved in chloroform D and the composition of a polyester was analyzed by $^1$H-NMR analysis using a nuclear magnetic resonance analyzer (NMR) 400-MR, manufactured by Varian, Inc.
(Molecular Weight)
A number average molecular weight (Mn) and a weight average molecular weight (Mw) were determined by the following procedure. Before adding a crosslinking agent, a polyester or a polyester composition was applied on a polyethylene terephthalate film subjected to a release treatment so as to be a thickness after drying of 100 μm, and then dried at 120° C. for 2 hours to remove a solvent. Then, the polyester layer or the polyester composition layer was peeled off from the film, weighed (0.01 g), added to 10 g of tetrahydrofuran (THF) and then allowed to stand for 24 hours thereby dissolving the layer. Using this solution for a gel permeation chromatography (GPC) method, each molecular weight was measured by a calibration curve formed by standard polystyrene.
(Measurement Conditions)
Name of apparatus: HLC-8220GPC, manufactured by TOSOH CORPORATION
Concentration of sample: 0.1% by weight (THF solution)
Injection amount of sample: 20 μl
Fluent: THF
Flow rate: 0.300 ml/min
Measuring temperature: 40° C.
Column: Sample column; TSKguardcolumn SuperHZ-L (one column)+TSKgel SuperHZM-M (two columns), Reference column; TSKgel SuperH-RC (one column), manufactured by TOSOH CORPORATION
Detector: differential refractive index detector (RI)
(Glass Transition Temperature of Polyester)
Using a differential scanning calorimeter (name of apparatus: DSC220, manufactured by Seiko Instruments Inc.), 5 mg of a measuring sample was placed in an aluminum pan and a glass transition temperature (Tg: ° C.) was determined by measuring under the measurement conditions of a temperature of −120 to 150° C. and a temperature rising rate of 20° C./minute.
(Hydroxyl Value of Polyester)
About 0.5 g of a sample (polyester) was placed in a 250 ml Erlenmeyer flask and the weight was measured. Then, 20.00 ml of a solution prepared by mixing acetic anhydride and anhydrous pyridine with adjusting a ratio of 1:10 (mass ratio) was taken and placed in the Erlenmeyer flask. After mounting a condenser, the solution was refluxed under stirring for 20 minutes and then cooled to room temperature. Furthermore, 20 ml of acetone and 20 ml of distilled water were added in the Erlenmeyer flask through the condenser. A phenolphthalein indicator was added thereto and titration was conducted using a 1.00 N (normal) aqueous sodium hydroxide solution. A hydroxyl value (mgKOH/g) was calculated by subtracting the measurement results of a blank (containing no sample) measured separately.
(Acid Value of Polyester)
After dissolving 0.2 g of a resin in 20 ml of chloroform, phenolphthalein was used as an indicator and the solution was titrated using a 0.100 N (normal) potassium hydroxide ethanol solution thereby calculating an acid value (mgKOH/g).
(Biomass Degree)
Biomass degree (%) was determined by calculating the percentage of the weight of a plant-derived monomer component (for example, dimer acid, sebacic acid, 1,3-propylene glycol, lactic acid, etc.) based on the total weight of monomer components used.
(Storage Elastic Modulus)
On a release liner, a pressure-sensitive adhesive layer measuring 3 mm in thickness and 8 mmϕ in length was formed to obtain a test sample. Then, the test sample was sandwiched between parallel plates (for a shear test) having a diameter of 7.9 mm and shear strain at a frequency of 1 Hz was applied thereto, and then a storage elastic modulus (G':Pa) at 23° C. was measured using a viscoelasticity test machine ARES manufactured by Rheometrics INC.
(Adhering Strength: Peel Strength)
A pressure-sensitive adhesive layer having a thickness adjusted to 50 μm was stuck on polyethylene terephthalate (thickness: 25 μm) to obtain a test sample measuring 100 mm in length and 20 mm in width. Then, the test sample was laminated on a stainless steel plate (SUS plate) by a single reciprocating motion with a roller of 2 kg and an adhering strength (pressure-sensitive adhering strength) (N/20 mm) was measured at a tension speed of 300 mm/min in accordance with JIS C 2107. A peel strength is appropriately selected according to applications and is not particularly limited. For example, when the polyester or polyester composition is used as a pressure-sensitive adhesive for production process, the peel strength is preferably from 2 to 20 N/20 mm, and more preferably from 4 to 10 N/20 mm.

(Retention Force)

A pressure-sensitive adhesive layer was formed on a release liner and the pressure-sensitive adhesive layer having a thickness adjusted to 50 μm was laminated on an aluminum tape having a thickness of 90 μm. Then, the obtained laminate was cut into a rectangle measuring 100 mm in length and 10 mm in width to obtain a test sample. Then, the test sample was laminated on a bakelite plate in an adhesive area measuring 2 mm in thickness, 125 mm in length and 25 mm in width so as to have the adhesive area measuring 20 mm in length and 10 mm in width. When the obtained laminate was allowed to stand at an atmospheric temperature of 40° C. for 30 minutes and then allowed to stand for 2 hours under a load of 0.5 kg in a vertical direction, a shift distance (mm) was measured and a shift distance per 1 hour was regarded as a retention force (mm/hr). The retention force is appropriately selected to applications and is not particularly limited. For example, when the polyester or polyester composition is used as a pressure-sensitive adhesive for production process, the retention force is preferably from 0 to 0.5 mm/hr, and more preferably from 0 to 0.1 mm/hr.

(Tack)

A test sample measuring 50 μm in thickness, 100 mm in length and 70 mm in width was made. Using the test sample, balls (steel balls) were rolled at an inclination angle of 30° and a runway length of 100 mm by a rolling ball method in accordance with JIS Z 0237 and a maximum diameter (inch) of balls stopped completely in the measuring portion having a length of 100 mm (a pressure-sensitive adhesive surface of a test sample) was evaluated as tack. The tack is appropriately selected according to applications and is not particularly limited. For example, when the polyester or polyester composition is used as a pressure-sensitive adhesive for production process, the maximum diameter is preferably from 7 to 15 inches, and more preferably from 9 to 12 inches.

TABLE 1

| Composition of polyester (mol % ratio) and evaluation results | | Example | | | | Comparative example | | |
|---|---|---|---|---|---|---|---|---|
| | | 1-1 | 1-2 | 1-3 | 1-4 | 1-1 | 1-2 | 1-3 |
| Produced polyester | | A | B | C | D | E | F | G |
| Acid component | Dimer acid | 30 | 26 | 35 | 29 | | | 14 |
| | Sebacic acid | 10 | 4 | | 9 | | | 5 |
| Glycol component | 1,3-propylene glycol | 39 | | 34 | 38 | | | 18 |
| | Neopentyl glycol | | 28 | | | | | |
| | Trimethylolpropane | 1 | 2 | 1 | | | | |
| Lactic acid component | | 20 | 40 | 30 | 24 | 70 | 51 | 63 |
| Copolymer component | ε-caprolactone | | | | | 30 | 49 | |
| Dibasic acid unit/glycol unit | | 1.0 | 1.0 | 1.0 | 1.0 | | | 1.1 |
| Glass transition temperature | (° C.) | −54 | −53 | −50 | −53 | −15 | −39 | −47 |
| Hydroxyl value | mgKOH/g | 6 | 9 | 6 | 2 | 1 | 0.6 | 26 |
| Acid value | mgKOH/g | 0.6 | 0.6 | 0.6 | 0.6 | 0.6 | 1.1 | 12.9 |
| Weight average molecular weight (Mw × 10$^4$) | | 15.3 | 28.5 | 19.8 | 9.2 | 7.4 | 8.3 | 1.2 |
| Number average molecular weight (Mn × 10$^4$) | | 2.9 | 3.1 | 3.3 | 3.6 | 5.4 | 4.9 | 0.5 |
| Dispersion degree (Mw/Mn) | | 5.3 | 9.2 | 6.0 | 2.6 | 1.4 | 1.7 | 2.4 |

TABLE 2

| Formulation of pressure-sensitive adhesive composition and evaluation results | | Example | | | | | Comparative example | | |
|---|---|---|---|---|---|---|---|---|---|
| | | 2-1 | 2-2 | 2-3 | 2-4 | 2-5 | 2-1 | 2-2 | 2-3 |
| Polyester | A | 100 | | 100 | 100 | 100 | | | |
| | B | | 100 | | | | | | |
| | E | | | | | | 100 | | |
| | F | | | | | | | 100 | |
| | G | | | | | | | | 100 |
| Branched polyester oligomer | H20 | | | 8 | | | | | |
| | H40 | | | | 8 | | | | |
| | H2004 | | | | | 30 | | | |
| Crosslinking agent | CORONATE HK | | 2 | 10 | 6 | | | 2 | |
| | DURANATE TPA100 | 8 | | | | 4 | 3 | | 2.5 |
| Peel strength | N/mm | 8 | 8 | 7 | 5 | 7 | 5 | 9 | 8 |
| Retention force | mm/hr | 0.1 | 0.1 | 0.2 | 0.3 | 0.3 | 0.1 | 0.8 | Dropping |
| Storage elastic modulus | ×10$^5$ Pa | 2.3 | 2.2 | 4.3 | 4 | 4.2 | 4.2 | 8.3 | 0.6 |
| Tack | Inch | 9 | 9 | 10 | 10 | 10 | 5 | 5 | 19 |
| Biomass degree | % | 92 | 85 | 84 | 87 | 72 | 58 | 39 | 93 |

As is apparent from Table 1, it could be confirmed that polyesters having desired properties can be obtained in the polyesters having a lactic acid unit, a dibasic acid unit and a glycol unit likes Examples 1-1 to 1-4 (polyesters A to D) included in the invention of the present application.

In contrast, since Comparative Example 1-1 (polyester E) does not contain dimer acid and a glycol unit, it was impossible to obtain predetermined numerical values of a glass transition temperature (Tg) and dispersion degree. Since Comparative Example 1-2 (polyester F) does not contain dimer acid and a glycol unit, it was impossible to obtain predetermined numerical values of a hydroxyl value and dispersion degree. Since Comparative Example 1-3 (polyester G) have low polymerization degree, it was impossible to obtain a predetermined numerical value of a weight average molecular weight.

As is apparent from Table 2, it could be confirmed that pressure-sensitive adhesion properties such as peel strength, retention force, storage elastic modulus and tack show satisfactory values in the pressure-sensitive adhesives (pressure-sensitive adhesive layer, pressure-sensitive adhesive sheet) of Examples 2-1 to 2-5, and these pressure-sensitive adhesives are excellent as pressure-sensitive adhesives. Also, biomass degree is 70% or more and therefore the content of a plant raw material is large, and thus a global-environmentally friendly pressure-sensitive adhesive could be obtained.

In contrast, it could be confirmed that the pressure-sensitive adhesive (pressure-sensitive adhesive layer, pressure-sensitive adhesive sheet) of Comparative Example 2-1 shows small tack, low biomass degree of 58% and poor pressure-sensitive adhesion properties, and therefore it is not environmentally friendly. It could be also confirmed that Comparative Example 2-2 shows too high retention force, small tack, very low biomass degree of 39% and poor pressure-sensitive adhesion properties, and therefore it is not environmentally friendly. It could be confirmed that Comparative Example 2-3 shows no retention force and too high tack.

The invention claimed is:

1. A polyester composition comprising:
   50 to 99 parts by wight of a first polyester, and 1 to 50 by weight of a second polyester;
   wherein the second polyester is a branched polyester oligomer having a hydroxyl value of 100 to 1,000 mgKOH/g, and
   wherein the first polyester comprises at least a lactic acid unit, a dibasic acid unit and a glycol unit,
   the dibasic acid unit contains dimer acid,
   the first polyester contains 20-40 mol % of lactic acid unit, 30-40 mol % of the dibasic acid unit and 30-40 mol % of the glycol unit; and
   the first polyester has a glass transition temperature as measured at a temperature rising rate of 20° C./minute using a differential scanning calorimeter, of −50 to −54° C., a weight average molecular weight of $9.2 \times 10^4$ to $28.5 \times 10^4$, a hydroxyl value of 2 to 9 mgKOH/g, an acid value of 0.6 mgKOH/g or less, and a dispersion degree (Mw/Mn) of 2.5 to 10.0.

2. The polyester composition according to claim 1, wherein a molar ratio of the dibasic acid unit to the glycol unit is 1:1.

3. The polyester according to claim 1 or 2, wherein the dibasic acid unit further contains an aliphatic dibasic acid other than dimer acid.

4. The polyester composition according to claim 1, wherein the first polyester contains, as a component other than the lactic acid unit, the dibasic acid unit and the glycol unit, a tri- or higher functional carboxylic acid and/or polyol.

5. A pressure-sensitive adhesive composition comprising the polyester composition according to claim 1, wherein the pressure-sensitive adhesive composition further contains a crosslinking agent.

6. The pressure-sensitive adhesive composition according to claim 5, wherein the crosslinking agent is a polyvalent isocyanurate.

7. A pressure-sensitive adhesive layer formed from the pressure-sensitive adhesive composition according to claim 5.

8. The pressure-sensitive adhesive layer according to claim 7, wherein a storage elastic modulus of the pressure-sensitive adhesive layer as measured under the conditions of 23° C. and a frequency of 1 Hz using a dynamic viscoelasticity measuring apparatus is from $1 \times 10^4$ to $1 \times 10^7$ Pa.

9. A pressure-sensitive adhesive sheet, wherein the pressure-sensitive adhesive layer according to claim 7 is formed on at least one surface of a support.

* * * * *